(12) United States Patent
Restle et al.

(10) Patent No.: US 10,652,006 B2
(45) Date of Patent: May 12, 2020

(54) DETERMINING CLOCK SIGNAL QUALITY USING A PLURALITY OF SENSORS

(71) Applicant: International Business Machines Corporation, Armonk, NY (US)

(72) Inventors: Phillip John Restle, Katonah, NY (US); Christos Vezyrtzis, New Rochelle, NY (US); James Douglas Warnock, Somers, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/841,539

(22) Filed: Dec. 14, 2017

(65) Prior Publication Data

US 2018/0198596 A1    Jul. 12, 2018

Related U.S. Application Data

(63) Continuation of application No. 15/400,716, filed on Jan. 6, 2017.

(51) Int. Cl.
*H04L 7/00* (2006.01)
*G06F 1/14* (2006.01)
(Continued)

(52) U.S. Cl.
CPC .............. *H04L 7/0008* (2013.01); *G06F 1/06* (2013.01); *G06F 1/12* (2013.01); *G06F 1/14* (2013.01)

(58) Field of Classification Search
CPC . H04L 7/0008; G06F 1/14; G06F 1/10; G06F 2217/62; H03K 5/135; H03K 19/0016; H03K 5/05
See application file for complete search history.

(56) References Cited

U.S. PATENT DOCUMENTS 4,926,115 A * 5/1990 Tarleton ................. G01R 25/00
                                                    324/76.47
5,298,866 A    3/1994 Kaplinsky
(Continued)

FOREIGN PATENT DOCUMENTS

EP    1271285 A2    2/2003
EP    1271285 B1    2/2003

OTHER PUBLICATIONS

Kirolos et al, "Mitigating Power-Supply Induced Delay Variations using Self Adjusting Clock Buffers", IEEE, 2008.
(Continued)

*Primary Examiner* — Sam K Ahn
*Assistant Examiner* — Amneet Singh
(74) *Attorney, Agent, or Firm* — Amin, Turocy & Watson, LLP

(57) ABSTRACT

Techniques for determining the quality of a clock signal are provided. In one example, a method can comprise comparing, by a sensory circuitry of a system, a first output of a first sensor and a second output of a second sensor. The first output and the second output can be based on a parameter of a clock signal. Further, in some embodiments, the first sensor and the second sensor can be local clock buffers. The method can also comprise determining, by a controller of the system, a quality of the clock signal based on the comparing of the first output and the second output.

15 Claims, 8 Drawing Sheets

(51) Int. Cl.
    *G06F 1/06*      (2006.01)
    *G06F 1/12*      (2006.01)

(56) References Cited

U.S. PATENT DOCUMENTS

| | | |
|---|---|---|
| 7,095,265 B2 | 8/2006 | Nguyen et al. |
| 7,400,555 B2 | 7/2008 | Franch et al. |
| 7,831,945 B2 | 11/2010 | Barnes |
| 7,956,664 B2 | 6/2011 | Chueh et al. |
| 8,854,100 B2 | 10/2014 | Sathe et al. |
| 9,304,534 B1 | 4/2016 | Sanchez |
| 2001/0013101 A1* | 8/2001 | Yoshikawa ........... H03L 7/0814 713/500 |
| 2004/0227554 A1 | 11/2004 | Park |
| 2005/0107970 A1 | 5/2005 | Franch et al. |
| 2011/0292855 A1 | 12/2011 | Saha et al. |
| 2015/0188527 A1 | 7/2015 | Francom et al. |
| 2015/0365076 A1 | 12/2015 | Bansal et al. |

OTHER PUBLICATIONS

Non-Final Office Action received for U.S. Appl. No. 15/400,716 dated Jan. 4, 2018, 24 pages.
Non-Final Office Action received for U.S. Appl. No. 15/400,716 dated Aug. 10, 2018, 24 pages.
Office Action received for U.S. Appl. No. 15/400,716 dated Feb. 13, 2019, 19 pages.
Non-Final Office Action received for U.S. Appl. No. 15/400,716 dated Jun. 24, 2019, 32 pages.

\* cited by examiner

DETERMINING CLOCK SIGNAL QUALITY USING A PLURALITY OF SENSORS

BACKGROUND

The subject disclosure relates to determining the quality of a clock signal, and more specifically, to comparing the local clock signal of a plurality of sensors to ascertain the quality of a global clock signal.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, methods and systems which facilitate determining the quality of a clock signal are described.

According to an embodiment, a method is provided. The method can comprise comparing, by a sensory circuitry of a system, a first output of a first sensor and a second output of a second sensor. The first output and the second output can be based on a parameter of a clock signal. Also, the first sensor and the second sensor can be local clock buffers. The method can also comprise determining, by a controller of the system, a quality of the clock signal based on the comparing of the first output and the second output.

According to another embodiment, a method is provided. The method can comprise determining, by a sensory circuitry of a system, a time delay of a local clock signal based on comparing a first output of a first sensor and a second output of a second sensor. The first sensor and the second sensor can comprise local clock buffers. Further, the method can comprise determining, by a controller of the system, a quality of a global clock signal based on the determining of the time delay of the local clock signal. The method can also comprise determining, by the controller of the system, whether the quality is greater than a defined threshold value.

According to another embodiment, a system is provided. The system can comprise a sensory circuitry and a controller. The sensory circuitry can comprise a first sensor, a second sensor, and a sensor circuit. The first sensor can generate a first output. The second sensor can generate a second output. Also, the sensor circuit can receive and compare the first output and the second output from the first sensor and the second sensor, respectively. Further, the first output and the second output can be generated based on a parameter of a clock signal. The controller can be communicatively coupled to the sensory circuitry and that can determine a quality of the clock signal based on the comparison of the first output and the second output.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

High speed digital systems, such as processors, can utilize clock signals to synchronize data transactions. Clock signals can be generated by signal sources such as, but not limited to, crystal oscillators, phased locked loop (PLL) generators, delayed locked loop (DLL) generators, or a combination thereof. The clock signal can then be sent to one or more distribution networks that distribute the clock signal to one or more digital systems (e.g., circuitry on a microprocessor chip). However, distribution of the clock signal to the one or more digital systems can require a significant amount of power. Thus, it is advantageous to optimize a waveform of the clock signal to produce a clock signal with a quality level facilitating synchronization of the data transactions but not so high as to consume more than the minimal amount of power needed to function properly.

In some embodiments described herein, the system can utilize local clock buffers (LCBs) to measure the quality of a global clock signal. In an embodiment, the on-chip system can adjust, dynamically one or more parameters of the global clock signal in response to the measured quality of the global clock signal in order to optimize or improve power efficiency. In another embodiment, the on-chip system can serve as a manufacturing test and can suggest one or more settings to adjust the global clock signal in order to optimize or improve power efficiency. In another embodiment, the on-chip system can serve as a manufacturing test to determine if a distribution network is sufficient for operation.

Figure 1:
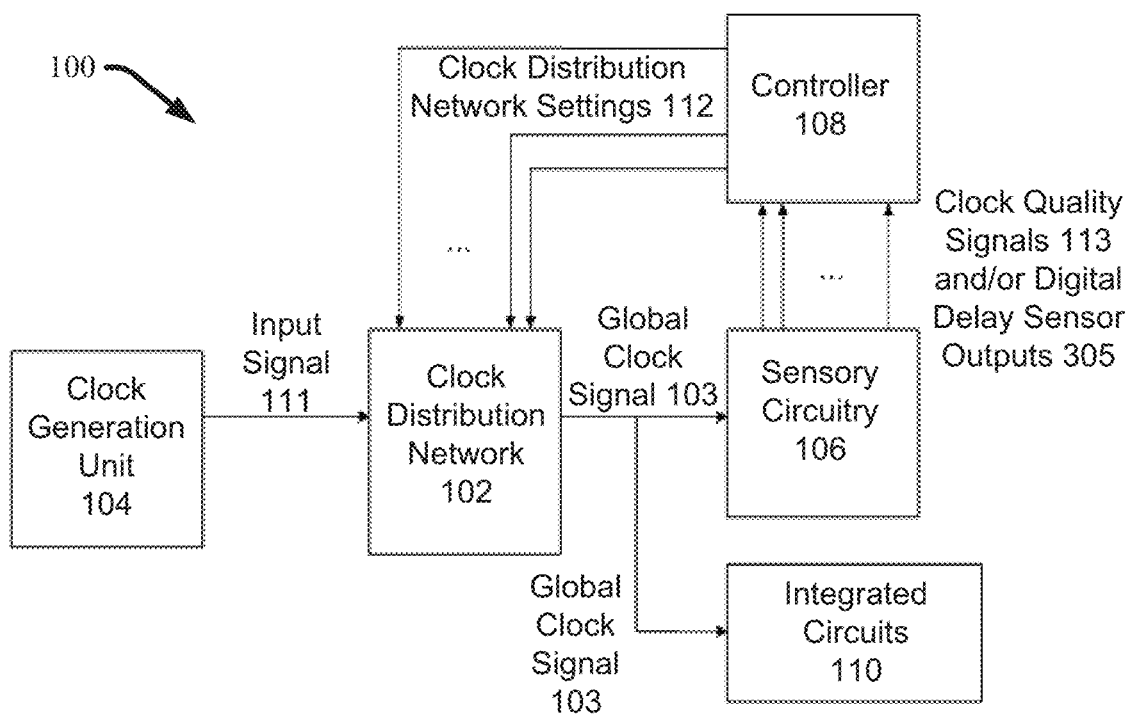
FIG. 1 illustrates a block diagram of an example, non-limiting system that measures the quality of a clock signal in accordance with one or more embodiments described herein.

FIG. 1 illustrates a block diagram of an example, non-limiting system that measures the quality of a clock signal in accordance with one or more embodiments described herein. In the embodiment shown, system 100 can comprise a clock generation unit 104, a clock distribution network 102, sensory circuitry 106, a controller 108, and one or more integrated circuits 110. As shown, one or more of the clock generation unit 104, clock distribution network 102, sensory circuitry 106, controller 108, and/or one or more integrated circuits 110 can be electrically and/or communicatively coupled to one another to perform one or more functions of system 100. In some embodiments, the system 100 can be provided on a single chip; however, in other embodiments, the system 100 can be provided over multiple chips or substrates associated with discrete components.

In some embodiments, one or more integrated circuits 110 can be located on the chip. The one or more integrated circuits 110 can utilize a global clock signal 103 propagated by the clock distribution network 102 to synchronize data transactions.

The clock generation unit 104 can comprise a PLL circuit (e.g., a digital PLL (DPLL)), a DLL circuit, or a combination thereof. For example, in some embodiments, the clock generation unit 104 can comprise a PLL circuit, a DLL circuit (or a combination thereof) to output an input signal 111 to the clock distribution network 102. In some embodiments, the clock generation unit 104 can be a DPLL and can output the input signal 111 to one or more clock distribution networks 102. Once the input signal 111 is received and propagated amongst the clock distribution network 102, it is thereinafter referred to as the "global clock signal" 103 for the clock distribution network the signal propagates within.

In some embodiments, the system 100 can optimize and/or determine one or more settings of a clock distribution network 102 to distribute a global clock signal 103 with a quality level sufficient for a defined functionality while exhibiting minimal (or reduced) power consumption. By way of example, but not limitation, the one or more settings can include altering a number of active buffers in the clock distribution network 102. By altering the number of active buffers in the clock distribution network 102, the system 100 can manipulate power distribution within the clock distribution network 102, which in turn manipulates signal strength of the global clock signal 103. Quality of the global clock signal 103 can be measured by the signal strength, signal phase noise, and/or signal jitter.

The clock distribution network 102 can comprise one or more control devices which can include, but are not limited to: clock driver circuits, resonant mode switches, buffers, or a combination thereof. The control devices can have variable signal strength controls, driver pulse width controls, or a combination thereof. Through adjustment of one or more parameters of the control devices, the clock distribution network 102 can exhibit behavior based on the one or more parameters thereby allowing a trade off between global clock signal 103 quality and power consumption. For example, the control devices can be adjusted to activate additional buffers in the clock distribution network, thereby increasing the quality the global clock signal 103. In another example, the control devices can be adjusted to a setting in which power consumption of the clock distribution network 102 is decreased, thereby decreasing the quality the global clock signal 103. System 100 shown in FIG. 1 includes a single clock distribution network 102, however, in other embodiments, multiple clock distribution networks are also envisaged as part of system 100. For example, the clock generation unit 104 can output the input signal 111 to two or more clock distribution networks 102.

Further, in some embodiments, the clock distribution network 102 can be structured in a tree formation (e.g., a standard tree, an X-tree, an H-tree formation, or a tapered H-tree), a grid formation, a serpentine formation, a spine formation, or a combination thereof. Also, each clock distribution network 102 in the system 100 can be arranged in formations independent of each other. For example, in one embodiment, a single clock distribution network 102 can be arranged in a standard tree formation. In another embodiment, a different clock distribution network 102 can be arranged in an H-tree formation with a second clock distribution network 102 arranged in a grid formation. In other words, the system 100 can comprise one or more clock distribution networks 102 arranged in one or more formations.

Figure 2:
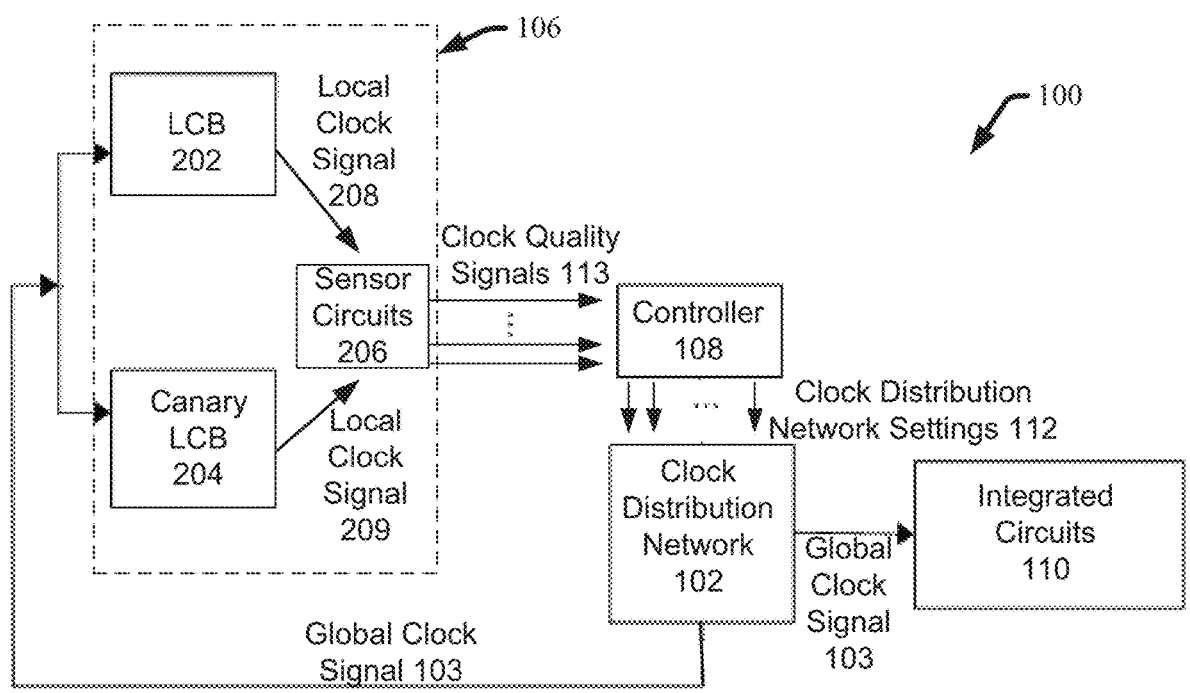
FIG. 2 illustrates a block diagram of an example, non-limiting system including sensory circuitry in accordance with one or more embodiments described herein.

The clock distribution network 102 can propagate the global clock signal 103 to sensory circuitry 106. FIG. 2 illustrates a block diagram of the system 100 which can include example, non-limiting sensory circuitry 106. Repetitive description of like elements employed in other embodiments described herein is omitted for sake of brevity. In an embodiment, the sensory circuitry 106 can comprise a LCB 202, one or more canary LCBs 204 which are more responsive to a parameter of the global clock signal 103 than the LCB 202, and one or more sensor circuits 206. LCBs can be used to regenerate the global clock signal 103. A LCB (e.g., LCB 202) can receive the global clock signal 103 and generate a local clock signal that can be distributed through a part of the clock distribution network which is communicatively coupled to the LCB. However, a variation between the global clock signal 103 and the local clock signal can occur due to the LCB's sensitivity to one or more parameters of the global clock signal 103 (e.g., signal amplitude, a rising slew rate, and a falling slew rate). As the quality of the global clock signal 103 deteriorates, variations between the local clock signal 208 and the global clock signal 103 can increase. Deterioration of the global clock signal 103 can be caused by numerous factors including, but not limited to: voltage, temperature, and aging.

The LCB 202 can be the same type or similar type of LCB as LCBs utilized in the one or more integrated circuits 110. The one or more integrated circuits 110 can use the global clock signal 103 to synchronize data transactions. Accordingly, in various embodiments, the structure and/or functionality of the LCB 202 can be the same as the type and/or functionality of one or more LCBs in the one or more integrated circuits 110. The LCB 202 can be sensitive to one or more parameters of the waveform of the global clock signal 103. In various embodiments, the one or more parameters can include, but are not limited to: signal amplitude, a rising slew rate, a falling slew rate, or a combination thereof. As used herein, the LCB 202 being sensitive to the one or more parameters can mean a change in the value of the one or more parameters can cause a change in the operation of the LCB 202.

In some embodiments, the formation of the local clock signal 208 can vary depending on the responsiveness of the LCB 202 to one or more parameters of the global clock signal 103. For example, variations between the local clock signal 208 and the global clock signal 103 can develop due to the responsiveness of the LCB 202 to the rising slew rate at a given amplitude for the global clock signal 103. For example, a slower rising slew rate for the global clock signal 103 can cause the LCB 202 to generate local clock signal 208 which exhibits excessive timing uncertainty, jitter.

In addition to the LCB 202, the sensory circuitry 106 can comprise one or more canary LCBs 204. As used herein, a "canary LCB" can mean an LCB which is designed to generate a local clock signal 208 having an exaggerated deviation from the global clock signal in response to one or more parameters of the global clock signal. In one or more embodiments, the canary LCB 204 can be an LCB designed to be functionally identical, or substantially identical, to the LCB 202, but more sensitive to the one or more parameters of the global clock signal 103 than the LCB 202. In other words, the canary LCB 204 can be more responsive to the one or more global clock signal 103 parameters in generating a local clock signal 208 than the LCB 202. For example, the canary LCB 204 can be designed to include multiple capacitors 404, 405 segregated by one or more inverters 402, 403; thereby enabling the canary LCB 204 have adjustable capacitance. Thus, given a particular parameter (e.g., rising slew rate of the global clock signal 103), the canary LCB 204 can output a local clock signal 208 that exhibits greater variation from the global clock signal 103 than the local clock signal 208 output from the LCB 202.

FIG. 2 illustrates a single canary LCB 204, however, in other embodiments, the sensory circuitry 106 can also include multiple canary LCBs 204.

Also, in an embodiment comprising multiple canary LCBs 204, each of the canary LCBs 204 can be sensitive to the same parameter (e.g. the amplitude of the global clock signal 103).

In some embodiments, each canary LCB 204 can be sensitive to a respective parameter. For example, one canary LCB 204 can be sensitive to the amplitude of the global clock signal 103, while another canary LCB 204 can be sensitive to a rising slew rate of the global clock signal 103.

The LCB 202 and the canary LCB 204 can receive the same input (e.g., the global clock signal 103 or a processed version of the global clock signal 103) and can produce respective local clock signals 208, 209. The local clock signals 208, 209 can be output to a sensor circuit 206. The sensor circuit 206 can comprise flip-flops, latches, digital gates (e.g., XOR and AND gates), a combination thereof, and the like. In some embodiments, the sensor circuit 206 can compare the local clock signals 208, 209 (e.g., the output of the LCB 202 and the output of the canary LCB 204) with one another to determine the quality of the global clock signal 103. Features of the local clock signals 208, 209 which can be compared by the sensor circuit 206 include, but are not limited to: pulse width, amplitude, voltage, time delay from the LCB to the sensor circuit 206, and a combination thereof.

In some embodiments, the sensor circuit 206 can output one or more clock quality signals 113 to a controller 108. The clock quality signals 113 can indicate any one of three possible results: a low quality clock result, an acceptable quality clock result, and an excessive quality clock result. In some embodiments, a low quality clock result can be a clock result in which there is a large amount of deviation between the local clock signal 208, 209 in regards to one or more features of the local clock signals 208, 209. In some embodiments, an acceptable quality clock result can be a clock result in which variation between the local clock signals 208, 209 exists but is marginal. In some embodiments, an excessive quality clock result can be a clock result in which variation between the local clock signals 208, 209 is nearly non-existent or negligible.

Figure 3:
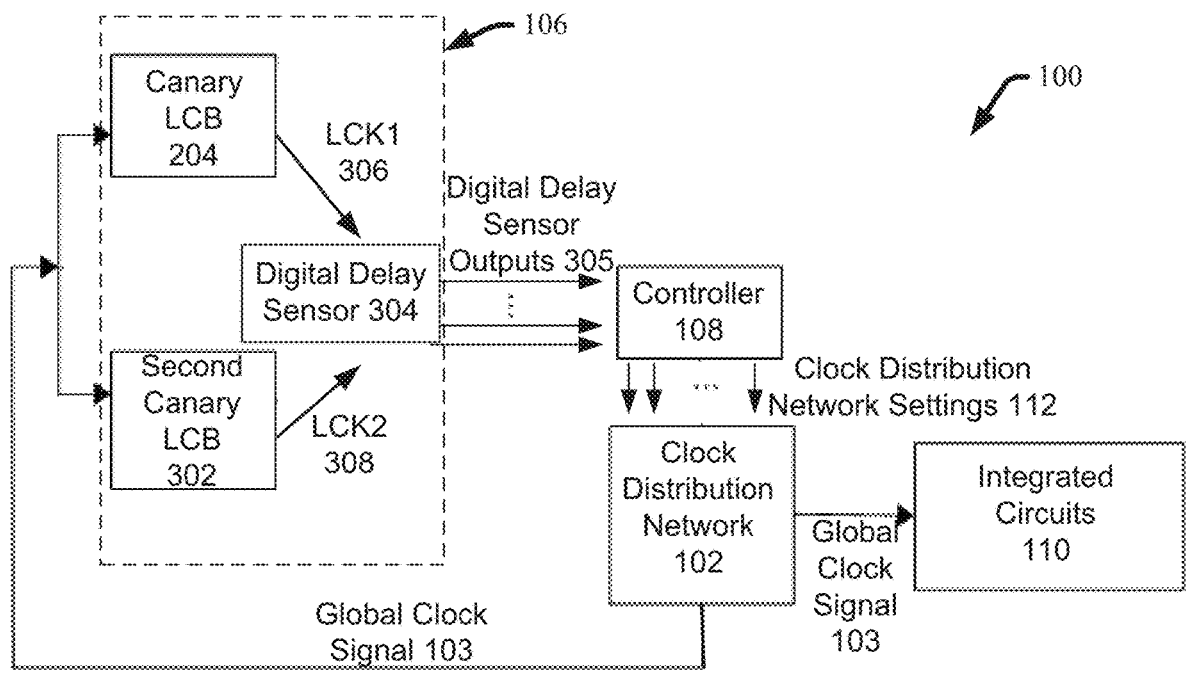
FIG. 3 illustrates a block diagram of an example, non-limiting system including sensory circuitry in accordance with one or more embodiments described herein.
Figure 4:
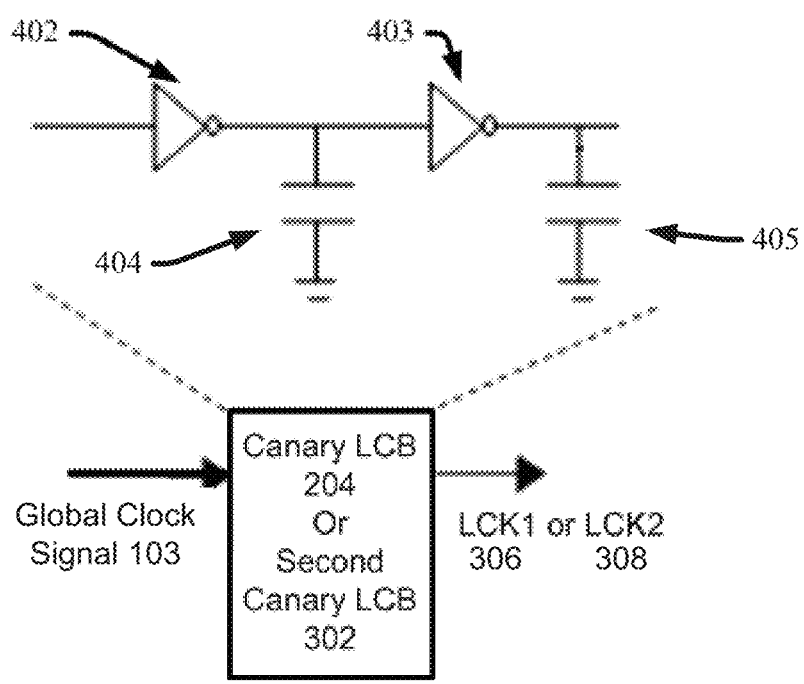
FIG. 4 illustrates a block diagram of an example, non-limiting canary local clock buffer that facilitates programmable capacitance in accordance with one or more embodiments described herein.

Referring to FIG. 3, another example, non-limiting sensory circuitry 106 is illustrated. Repetitive description of like elements employed in other embodiments described herein is omitted for sake of brevity. Whereas the sensory circuitry 106 shown in FIG. 2 can compare the local clock signals 208, 209 of a LCB 202 and canary LCB 204, the sensory circuitry 106 shown in FIG. 3 can compare the local clock signals 208, 209 of a canary LCB 204 and one or more second canary LCBs 302. The second canary LCB 302 can have the same design and/or functionality characteristics as the canary LCB 204 described herein. For example, the second canary LCB 302 can be more sensitive to one or more parameters of the global clock signal 103 than a LCB 202. As shown in FIG. 4, the canary LCB 204 and the second canary LCB 302 can comprise one or more inverters 402, 403 and one or more capacitors 404, 405. Thus, the canary LCB 204 can be loaded with programmable capacitance. Repetitive description of like elements employed in other embodiments described herein is omitted for sake of brevity.

The sensory circuitry 106 can include a digital delay sensor 304. The digital delay sensor 304 can compare the outputs of the canary LCB 204 and the second canary LCB 302. The digital delay sensor 304 can produce a digital delay sensor output 305 that is sensitive (e.g., responsive) to the capacitance of the canary LCB 204 and the second canary LCB 302. As capacitors 404, 405 are added to the canary LCB 204 or the second canary LCB 302, the respective local clock signal (e.g., local clock signal 208) can be sent to the digital delay sensor 304 at greater delays. For example, a canary LCB 204 with two capacitors 404, 405 can have a delay of 10 picoseconds (ps) to the digital delay sensor 304 and cause a first digital delay sensor output 305; while a second canary LCB 302 with three capacitors can output can have a delay of 15 ps to the digital delay sensor 304 and causes a second digital delay sensor output 305. In other words, the quality of the global clock signal 103 can affect the responsiveness of the digital delay sensor 304.

The quality of the global clock signal 103 affects the delay of the canary LCB 204 and the second canary LCB 302. Thus measuring said delay yields useful information about the of the global clock signal 103 quality. The delay sensitivity of the canary LCB 204 and the second canary LCB 302 to the quality of the global clock signal 103 can be adjusted using (for example), the programmable capacitors 404, 405 shown in FIG. 4. Also, the digital delay sensor 304 (e.g. a latch-tapped delay line) can measure the delay of the canary LCB 204 and the second canary LCB 302 as a timing-to-digital converter. Since absolute timing measurements can be inaccurate, the digital delay sensor 304 can measure the timing difference between the canary LCB 204 and the second canary LCB 302 to generate an accurate measure of the quality of the global clock signal 103.

Since the capacitance of the canary LCB 204 and the second canary LCB 302 are programmable, one of the local clock signals 208, 209 can be used as a reference upon which to compare another local clock signal. For example, the canary LCB 204 can comprise X number of capacitors 404, 405 and output a first local clock signal LCK1 306; while the second canary LCB 302 can comprise X+N capacitors 404, 405, wherein N is a whole integer, and output a second local clock signal LCK2 308. The digital delay sensor 304 can compare LCK1 306 and LCK2 308 to generate one or more digital delay sensor outputs 305 that are based on a parameter of the global clock signal 103 and thereby ascertain the quality of the global clock signal 103.

For example, the canary LCB 204 can comprise two capacitors 404, 405 and the second canary LCB 302 can comprise four capacitors (wherein X equals 2, and N equals 2). If the global clock signal 103 has a large amplitude (or an amplitude greater than a defined threshold, which can be designed to change from time to time or based on one or more detected conditions), a digital delay sensor output 305 in regards to LCK2 308 can be shifted by one position in reference to another digital delay sensor output 305 in regards to LCK1 306. In another example, the canary LCB 204 can comprise two capacitors 404, 405 and the second canary LCB 302 can comprise three capacitors (wherein X equals 2, and N equals 1). If the global clock signal 103 has a small amplitude (or an amplitude less than a defined threshold, which can be designed to change from time to time or based on one or more detected conditions), a digital delay sensor output 305 in regards to LCK2 308 can be shifted by one position in reference to a digital delay sensor output 305 in regards to LCK1 306.

FIG. 3 illustrates sensory circuitry 106 comprising one second canary LCB 302. However, sensory circuitry 106 comprising multiple second canary LCBs 302 is also envisaged in other embodiments. For example, the sensory circuitry 106 can comprise two second canary LCBs 302. Additionally, each (or, in some embodiments, one or more) of the second canary LCBs 302 can be programmed to measure responsiveness to the same parameter of the global clock signal 103 or to different parameters respectively. For example, a first second canary LCB 302 can comprise four capacitors and another second canary LCB 302 in the same sensory circuitry 106 can comprise three capacitors. Thus, each second canary LCB 302 can exhibit separate programmed capacitances.

Referring back to FIG. 1, in one embodiment, the controller 108 can comprise a microcontroller having hardware and/or software that can process the clock quality signals 113 or digital delay sensor outputs 305 and/or adjust one or more clock distribution network settings 112 in such a way that the quality of the global clock signal 103 is acceptable and power is controlled. For example, in some embodiments, the quality of the global clock signal 103 can be determined to acceptable based on a determination that a local clock signal 209 reaches the sensor circuit 206 with minimal delay, as compared to the local clock signal 208, wherein minimal delay can constitute any amount of delay which does not result in inversion of the local clock signal 209.

The microcontroller can include one or more central processing units (CPU), non-volatile memory (e.g., read-only memory, flash memory, and ferroelectric random-access memory (RAM)), volatile memory (e.g., RAM), an input device, and an output device. The controller 108 can receive clock quality signals 113 and/or digital delay sensor outputs 305 from the sensory circuitry 106. Further, the controller 108 can analyze the clock quality signals 113/ digital delay sensor outputs 305 to determine whether the clock distribution network 102 needs adjustment to produce a more power-efficient global clock signal 103. For example, the controller 108 can determine that less variation exhibited between the local clock signals 208, 209 (e.g., between the local clock signal of the LCB 202 and the local clock signal of the canary LCB 204 or between LCK1 306 and LCK2 308), indicates a better quality of the global clock signal 103. As differences between the local clock signals 208, 209 increase and/or multiply, the controller 108 can determine that the quality of the global clock signal 103 is poor.

For example, if a local clock signal (e.g., local clock signal 208) shows high levels of timing jitter or phase noise as a result of the comparison by the sensory circuitry 106, then the controller 108 can determine that the global clock signal 103 has poor quality (e.g., a low quality clock result). In another example, if a local clock signal (e.g., local clock signal 208) is received by the sensor circuits 206 or the digital delay sensor 304 after a significant time delay, the controller 108 can determine that the global clock signal 103 has poor quality (e.g., a low quality clock result). In another example, if a comparison of digital delay sensor outputs 305 indicates a shift of more than two positions between a digital delay sensor output 305 regarding LCK1 306 and a digital delay sensor output 305 regarding LCK2 308, the controller 108 can determine that the global clock signal 103 has poor quality (e.g., a low quality clock result). Likewise, when variations between the local clock signals 208, 209 are non-existent, immeasurable, or negligible, the controller 108 can determine that the quality of the global clock is inefficient as the quality of the clock is unnecessarily good (e.g., an excessive-quality clock result).

In an embodiment in which the controller 108 determines adjustments are necessitated, the controller 108 can output any number of clock distribution network settings 112 (e.g., 1 to 100 different clock distribution network settings 112) to the control devices of the clock distribution network. The clock distribution network settings 112 can activate or deactivate one or more control devices of the clock distribution network 102. Adjustments to the clock distribution network 102 in accordance with the clock distribution settings can increase or decrease the quality of the global clock signal 103.

For example, the clock distribution settings can instruct the control devices (e.g., clock driver circuits, resonant mode switches, or a combination thereof) to activate additional clock buffers in the clock distribution network 102 or to deactivate clock buffers in the clock distribution network 102. Therefore, the controller 108 can minimize (or, in some embodiments, reduce) power consumption in the clock distribution network 102 while maintaining clock quality.

Thus, in an embodiment, system 100 can function on-the-fly (e.g., while the integrated circuits 110 are operating using the global clock signal 103) and in a loop to continually monitor and/or adjust the clock signal of a chip upon which the system 100 is integrated. For example, the controller 108 can analyze the clock quality signals 113 and/or digital delay sensor outputs 305 and output clock distribution network settings 112, if necessary, every microsecond while the integrated circuits 110 are operating In another example, the controller 108 can analyze the clock quality signals 113 and/or digital delay sensor outputs 305 and output clock distribution network settings 112, if necessary, every nanosecond while the integrated circuits 110 are operational.

In another embodiment, the system 100 can perform quality testing during manufacturing test of a chip upon which the system 100 is integrated. The controller 108 can analyze the clock quality signals 113 and/or digital delay sensor outputs 305 to generate suggested clock distribution network settings 112. The suggested clock distribution network settings 112 could then be implemented by a manufacturer (or manufacturing device or system) instead of the suggested clock distribution network settings 112 being an automatic output of the controller 108. Thus, the manufacturer (or manufacturing device or system) could use the system 100 to identify clock distribution networks 102 on a chip that produce a clock signal at an inefficient quality and decide whether or not to implement suggested clock distribution network settings 112 to increase the efficiency of the identified clock distribution network 102.

In another embodiment, the system 100 can provide a pass/fail test during manufacture of a chip upon which the system 100 is integrated. The controller 108 can analyze the clock quality signals 113 and/or digital delay sensor outputs 305 to determine whether the clock distribution network 102 propagates a clock signal with a high enough quality to meet or surpass a predefined criteria. For example, the sensory circuitry 106 can comprise the sensor circuit 206, wherein a significant time delay by the local clock signal generated by the canary LCB 204 (in comparison to the time the local clock signal generated by the LCB 202 reached the sensor circuit 206) can result in the local clock signal having a wide pulse, which can cause the sensor circuit 206 to report a failure. For instance, if the sensor circuit 206 comprises a latch, a wide pulse by the local clock signal can clock the latch and make the output flip thereby leading to a failure report. In another instance, if the sensor circuit 206 comprises a flip-flop, a wide pulse by the local clock signal can change the state of the top flip-flop thereby causing the bottom flip-flop to report a failure. In another example, the sensory circuitry 106 can comprise the digital delay sensor 304 wherein a time delay by the LCK2 308, in comparison to how long it took LCK1 306 to equal the global clock signal 103, can shift a digital delay sensor output 305. The controller 108 can determine that the signal quality is poor when a shift in digital delay sensor outputs 305 is greater than a defined value of positions.

Figure 5:
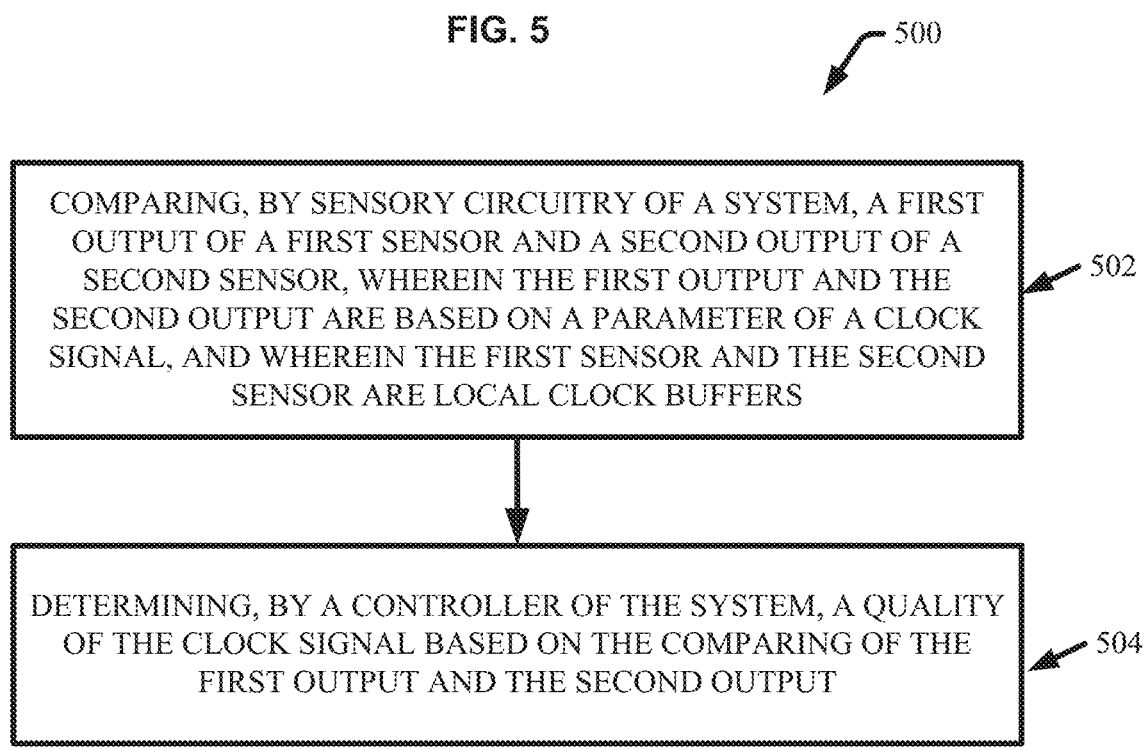
FIG. 5 illustrates a flow diagram of an example, non-limiting method that facilitates determining the quality of a clock signal using a plurality of sensors in accordance with one more embodiments described herein.

FIG. 5 illustrates a method 500 for determining the quality of a clock signal utilizing the system 100 according to one or more embodiments. Repetitive description of like elements employed in other embodiments described herein is omitted for sake of brevity. At 502, the method 500 can comprise comparing, by the sensory circuitry 106 of the system 100, a first output (e.g., a local clock signal) of a first sensor (e.g., LCB 202, a canary LCB 204 or second canary LCB 302), and a second output (e.g., another local clock buffer) of a second sensor (e.g., LCB 202, a canary LCB 204 or second canary LCB 302). The first output and the second output can be based on a parameter (e.g., a signal amplitude, a rising slew rate, a falling slew rate, or a combination thereof) of a clock signal. At 504, the method 500 can comprise determining, by the controller 108 of the system 100, a quality of the clock signal based on the comparing of the first output and the second output.

Figure 6:
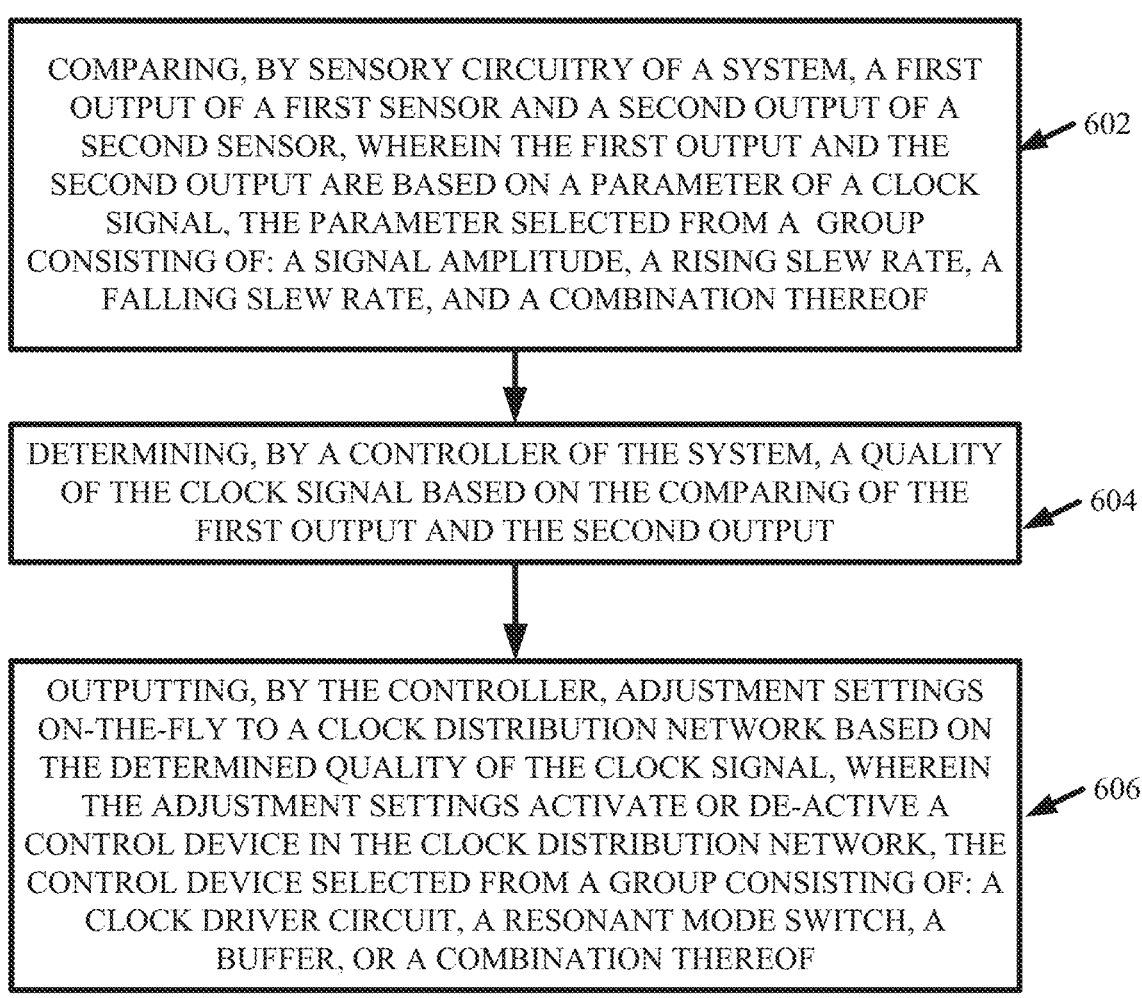
FIG. 6 illustrates a flow diagram of another example, non-limiting method that facilitates determining and adjusting the quality of a clock signal using a plurality of sensors in accordance with one more embodiments described herein.

FIG. 6 illustrates a method 600 for determining and subsequently adjusting the quality of a clock signal utilizing the system 100 according to one or more embodiments. Repetitive description of like elements employed in other embodiments described herein is omitted for sake of brevity. At 602, the method 600 can comprise comparing, by the sensory circuitry 106 of the system 100, a first output (e.g., a local clock signal) of a first sensor, such as a normal LCB (e.g., LCB 202) or a canary LCB (e.g., canary LCB 204 or second canary LCB 302), and a second output (e.g., another local clock buffer) of a second sensor, such as a normal LCB (e.g., LCB 202) or a canary LCB (e.g., canary LCB 204 or second canary LCB 302). The first output and the second output can be based on a parameter (e.g., a signal amplitude, a rising slew rate, a falling slew rate, or a combination thereof) of a clock signal. At 604, the method 600 can comprise determining, by the controller 108 of the system 100, a quality of the clock signal based on the comparing of the first output and the second output. Also, at 606 the method 600 can comprise outputting, by the controller 108, adjustment settings (e.g., clock distribution network settings 112) on-the-fly to the clock distribution network 102 based on the determined quality of the clock signal. The adjustment settings can activate or de-active a control device (e.g., a clock driver circuit, a resonant mode switch, a buffer, or a combination thereof) in the clock distribution network 102.

Figure 7:
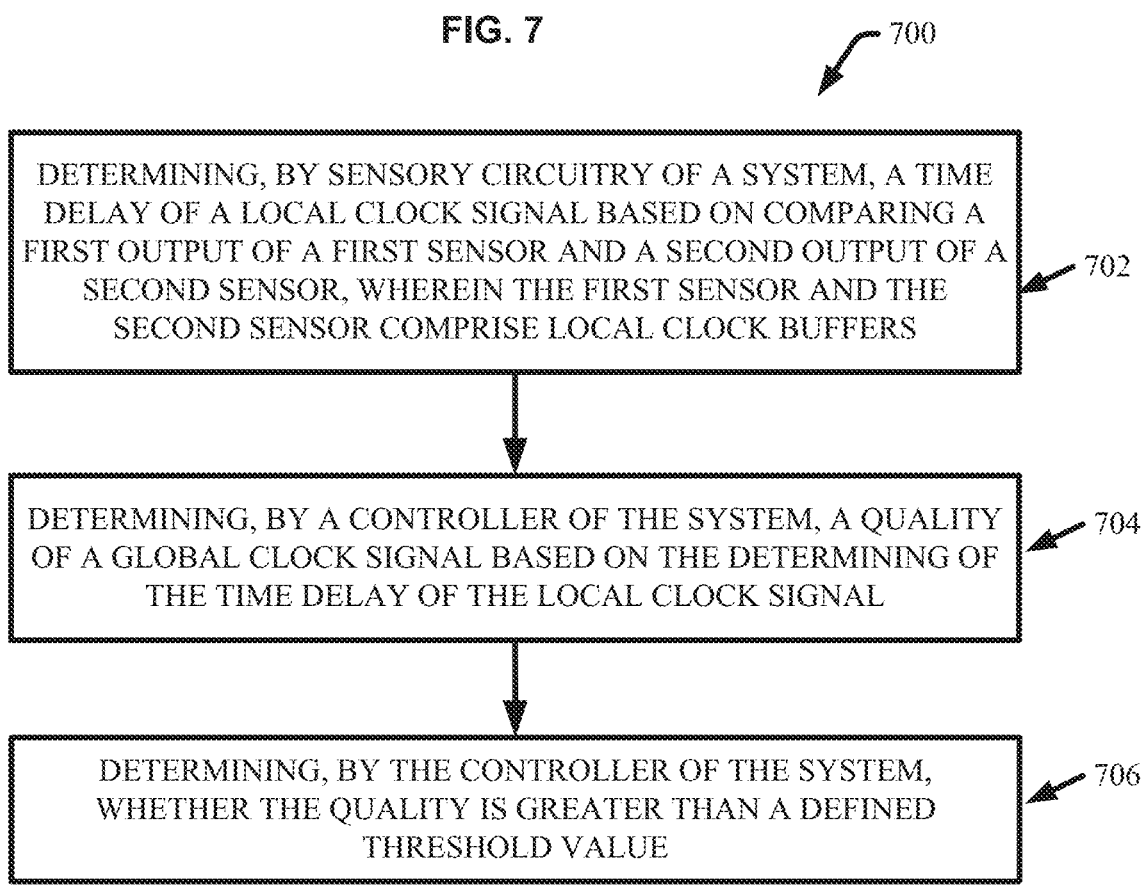
FIG. 7 illustrates a flow diagram of another example, non-limiting method that facilitates determining the quality of a clock signal using a plurality of sensors in accordance with one more embodiments described herein.

FIG. 7 illustrates a method 700 for determining the quality of a clock signal utilizing the system 100 according to one or more embodiments. Repetitive description of like elements employed in other embodiments described herein is omitted for sake of brevity. At 702, the method 700 can comprise determining, by sensory circuitry 106 of a system 100, a time delay of a local clock signal based on comparing a first output of a first sensor (e.g., a LCB) and a second output of a second sensor (e.g., another LCB). The first output and the second output can be based on a parameter of the global clock signal 103. At 704, the method 700 can comprise determining, by a controller 108 of the system 100, a quality of the global clock signal 103 based on the determining of the time delay of the local clock signal. At 706, the method 700 can further comprise determining, by the controller 108, whether the quality of the global clock signal 103 is greater than a defined threshold value.

Figure 8:
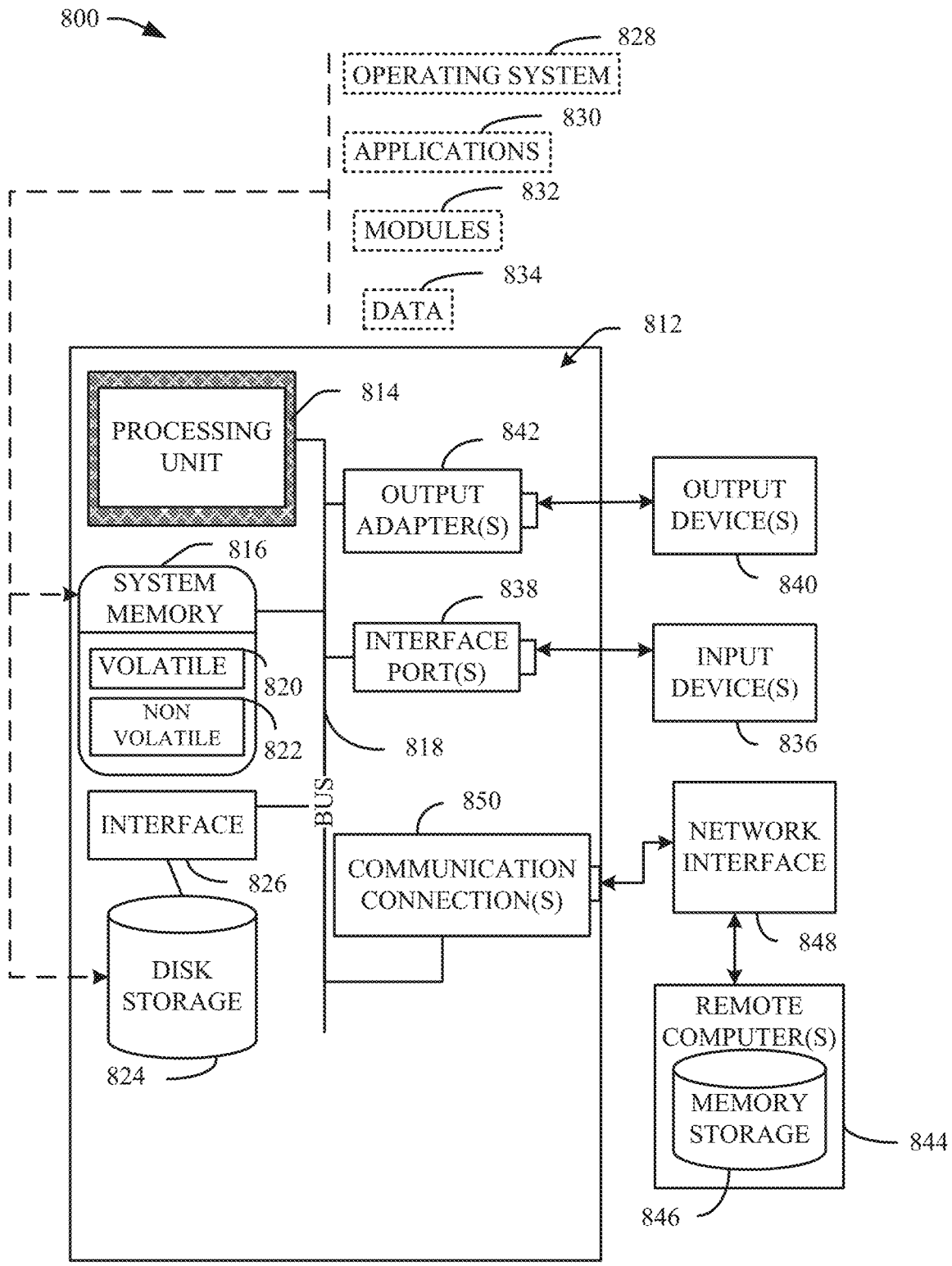
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity. With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 820 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The description of the various embodiments of the present invention have been presented for purpose of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Further, what has been described above include mere examples of devices and methods. It is, of course, not possible to describe every conceivable combination of components or methods for purposes of describing this disclosure, but one of ordinary skill in the art can recognize that many further combinations and permutations of this disclosure are possible. Furthermore, to the extent that the terms "include," "have," "possess," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:

comparing, by sensory circuitry of a system, a first output of a first sensor and a second output of a second sensor, wherein the first output and the second output are based on a parameter of a clock signal, and wherein the first sensor and the second sensor comprise respective local clock buffers, wherein each of the respective local clock buffers comprise a series of inverters with a capacitor coupled to ground between consecutive inverters in the series of inverters, to enable the respective local clock buffers to have adjustable capacitances, and wherein an increase in a number of the capacitors in the first sensor or the second sensor causes a corresponding increase in delay of the first output or the second output sent to a digital delay sensor such that a first total number of capacitors, X, in the first sensor causes a first delay of the first output to the digital delay sensor and a second total number of capacitors in the second sensor causes a second delay of the second output to the digital delay sensor, wherein the first delay is less than the second delay based on the first total number of capacitors being less than the second total number of capacitors wherein the second total number of capacitors equal X+N, wherein X and N are whole integers; and determining, by a controller of the system, a quality of the clock signal based on the comparing of the first output and the second output.

2. The method of claim 1, wherein the parameter is selected from a group consisting of a signal amplitude, a rising slew rate and a falling slew rate.

3. The method of claim 1, further comprising outputting, by a clock distribution network of the system, the clock signal to an integrated circuit of the system.

4. The method of claim 1, wherein the adjustable capacitances of the first sensor and the second sensor are programmable, and wherein a delay sensitivity of the first sensor and the second sensor to the quality of the clock signal is adjustable employing the adjustable capacitances.

5. The method of claim 4, further comprising receiving, by the digital delay sensor of the sensory circuitry of the system, the first output and the second output.

6. The method of claim 5, further comprising determining, by the digital delay sensor, a difference between a first time and a second time, wherein the first time is associated with receipt of the first output by the digital delay sensor and wherein the second time is associated with receipt of the second output.

7. The method of claim 1, further comprising propagating, by the clock distribution network of the system, the clock signal and wherein the clock distribution network comprises a control device selected from a group consisting of a clock driver circuit and a resonant mode switch.

8. The method of claim 7, further comprising outputting to the clock distribution network, by the controller, an adjustment setting based on the quality of the clock signal.

9. The method of claim 8, wherein the adjustment setting activates or deactivates the control device.

10. The method of claim 8, wherein the outputting the adjustment setting is performed during operation of an integrated circuit employing the clock signal.

11. The method of claim 1, wherein the first sensor and the second sensor are canary buffers.

12. A method, comprising:

determining, by sensory circuitry of a system, a time delay of a local clock signal based on comparing a first output of a first sensor and a second output of a second sensor, wherein the first sensor and the second sensor comprise respective local clock buffers, wherein each of the respective local clock buffers comprise a series of inverters with capacitors coupled to ground between consecutive inverters in the series of inverters, to enable the respective local clock buffers to have adjustable capacitances, and wherein an increase in a number of the capacitors in the first sensor or the second sensor causes a corresponding increase in delay of the first output or the second output sent to a digital delay sensor such that a first total number of capacitors, X, in the first sensor causes a first delay of the first output to the digital delay sensor and a second total number of capacitors in the second sensor causes a second delay of the second output to the digital delay sensor, wherein the first delay is less than the second delay based on the first total number of capacitors being less than the second total number of capacitors wherein the second total number of capacitors equal X+N, wherein X and N are whole integers determining, by a controller of the system, a quality of a global clock signal based on the determining of the time delay of the local clock signal; and determining, by the controller of the system, whether the quality is greater than a defined threshold value.

13. The method of claim 12, wherein the time delay is affected by a parameter of the global clock signal.

14. The method of claim 13, wherein the parameter is selected from a group consisting of a signal amplitude, a rising slew rate, and a falling slew rate.

15. The method of claim 13, wherein the first sensor has a first level of responsiveness to the parameter and the second sensor has a second level of responsiveness to the parameter, wherein the first level of responsiveness is greater than the second level of responsiveness.

* * * * *